Jan. 31, 1939.  D. W. VOORHEES, JR  2,145,675
PIVOTAL AXLE FOR STEEL FARM TRUCKS
Filed July 24, 1936
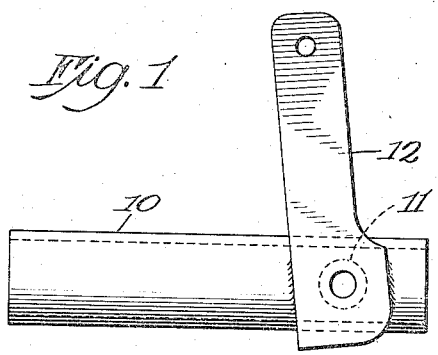
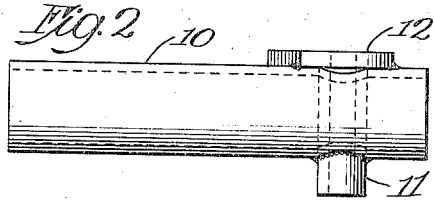
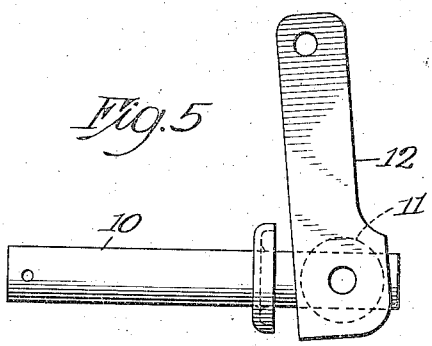
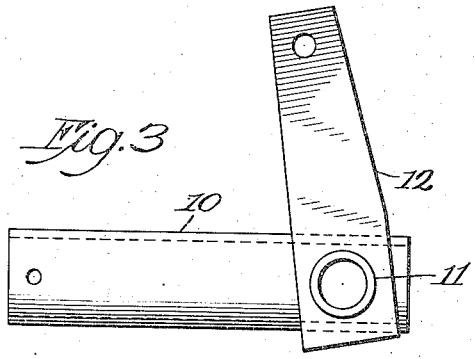
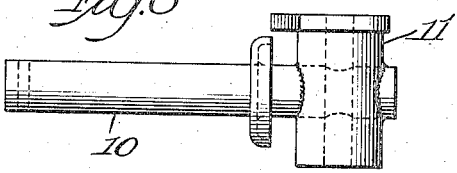
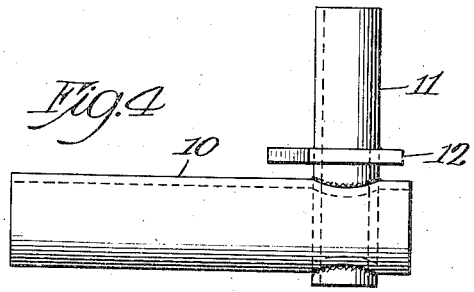

Patented Jan. 31, 1939

2,145,675

UNITED STATES PATENT OFFICE 2,145,675

PIVOTAL AXLE FOR STEEL FARM TRUCKS

Daniel W. Voorhees, Jr., Peru, Ill.

Application July 24, 1936, Serial No. 92,287

2 Claims. (Cl. 280—96.1)

This invention is directed to steel farm trucks or wagons having pivotal axles of the automobile type and particularly to the pivotal axles themselves.

One object of the invention is to provide pivotal axles for steel farm trucks to take various sizes and kinds of wheels with both plain and roller bearings.

Another object is to provide a construction of the pivotal axles which can be made from common materials ordinarily on hand in factories making trucks of this kind.

Another object is to provide a construction which can be made from the same equipments usually available in metal working factories making farm trucks of this kind.

Other objects will be disclosed from the following drawing and descriptions of which—

Fig. 1 is the plan view of an axle with a steel tube as the axle member and another steel tube as the pintle member and a flat section radius arm all welded together;

Fig. 2 is the elevation view of the same pivotal axle;

Fig. 3 is the plan view of a tubular axle with a larger pintle tube and with the radius arm mounted nearly central of the pintle.

Fig. 4 is an elevational view of the same axle as in Fig. 3.

Fig. 5 is a plan view of a solid steel axle inserted in a solid pintle member with a steel hub washer welded on the axle member and a flat steel radius arm welded on the pintle member;

Fig. 6 is an elevational view of the same solid steel axle.

In Figs. 1 and 2 the axle 10 is a plain steel tubing either cold drawn or welded. Pintle 11 is also a tubing but is relatively small in diameter because the radius arm 12 is welded directly to the axle 10 and thereby derives sufficient strength for the stresses imposed.

In Figs. 3 and 4 the axle 10 and the pintle are also made of steel tubing but inasmuch as the radius arm is positioned at a point approximately central, the pintle tube 11 is made larger to afford sufficient welding area for the radius arm 12.

In Figs. 5 and 6 axle 10 and pintle 11 are made from solid bars of steel with the axle 10 inserted through pintle 11 and welded together. The radius arm 12 is welded directly to the top of pintle 11 and the pivot bolt hole drilled through all three members after assembly.

Having thus described my invention, what I now claim as new is:

1. A structure of the type specified comprising an axle equipped adjacent an end thereof with a transverse opening, a transversely extending member snugly fitting said opening and extending through the same and welded to said axle, and a radius arm extending substantially transversely and tangentially of said axle and welded to one end of said member.

2. A structure of the type specified comprising a tubular axle equipped adjacent an end portion thereof with transverse diametrically opposed openings, a transversely disposed member extending through and snugly fitting said openings and welded to said axle, and a radius arm welded to one end of said member and extending substantially tangentially of the axle with its outer end spaced appreciably from the latter.

DANIEL W. VOORHEES, Jr.